United States Patent
Wilhelmsson et al.

(10) Patent No.: US 6,898,425 B1
(45) Date of Patent: *May 24, 2005

(54) METHOD IN A COMMUNICATION NETWORK

(75) Inventors: Lars Wilhelmsson, Höglidsvägen (SE); Torsten Nilsson, Lur (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/556,593

(22) Filed: Apr. 21, 2000

Related U.S. Application Data
(60) Provisional application No. 60/172,295, filed on Dec. 16, 1999.

(30) Foreign Application Priority Data

Mar. 21, 2000 (SE) .............................................. 0000960

(51) Int. Cl.[7] .............................................. H04Q 7/20
(52) U.S. Cl. ...................... 455/423; 455/424; 455/561; 370/328; 370/338
(58) Field of Search ................................ 455/446, 561, 455/422.1, 423, 433, 456.1, 426.1, 450, 424, 435.1, 435.2, 445, 432.1, 457, 458, 517, 525; 370/473, 493, 328, 335, 349, 329, 352

(56) References Cited

U.S. PATENT DOCUMENTS

| | | | | |
|---|---|---|---|---|
| 5,297,193 A | * | 3/1994 | Bouix et al. ................. | 455/423 |
| 5,541,978 A | * | 7/1996 | Brunner et al. .............. | 455/423 |
| 5,790,534 A | * | 8/1998 | Kokko et al. ................ | 370/335 |
| 5,862,488 A | * | 1/1999 | Kotzin et al. ................ | 455/510 |
| 5,884,174 A | * | 3/1999 | Nagarajan et al. ........... | 455/436 |
| 6,178,327 B1 | * | 1/2001 | Gomez ........................ | 455/445 |
| 6,233,458 B1 | * | 5/2001 | Haumont et al. ............ | 455/445 |
| 6,282,424 B1 | * | 8/2001 | Wright et al. ................ | 455/450 |
| 6,317,421 B1 | * | 11/2001 | Wilhelmsson et al. ....... | 370/328 |
| 6,320,873 B1 | * | 11/2001 | Nevo et al. .................. | 370/466 |
| 6,442,395 B1 | * | 8/2002 | Refai et al. ................. | 455/510 |
| 6,505,047 B1 | * | 1/2003 | Palkisto .................... | 455/456.1 |
| 6,681,113 B1 | * | 1/2004 | Greene et al. .............. | 455/453 |

FOREIGN PATENT DOCUMENTS

| | | |
|---|---|---|
| DE | 196 11 947 | 6/1997 |
| WO | WO 97/16007 | 5/1997 |
| WO | WO 00/19742 | 4/2000 |
| WO | WO 00/35153 | 6/2000 |
| WO | 99/01713 | 10/2000 |

OTHER PUBLICATIONS

U.S. Appl. No. 09/594,819, filed Jun. 16, 2000.
Digital Cellular Telecommunications System (Phase 2+); General Packet Radio Service (GPRS); Base Station System (BSS)—Serving GPRS Support Node (SGSN) Interface; Network Service; (GSM 08.16 Version 7.1.0 Release 1998), TS 101 299 V7.1.0 (1999–07), European Telecommunications Standards Institute (ETSI) 1999, pp. 1–39.
Digital Cellular Telecommunications System (Phase 2+); General Packet Radio Service (GPRS); Base Station System (BSS)—Serving GPRS Support Node (SGSN), BSS GPRS Protocol (BSSGP); (GSM 08.18 Version 7.0.0 Release 1998), TS 101 343 V7.0.0 (1999–07), European Telecommunications Standards Institute (ETSI) 1999, pp. 1–64.
R. Droms, "Dynamic Host Configuration Protocol", RFC 2131, Bucknell University, Mar., 1997, pp. 1–36.

* cited by examiner

Primary Examiner—Temica M. Davis

(57) ABSTRACT

The present invention is related to a method of configuring an interface between a serving GPRS support node and a base station system. A signal is transmitted (401) from the base station system to the serving GPRS support node indicating cancellation of at least one BSSGP virtual connection associated with a first network service entity identifier. Upon receipt of the cancellation signal at the serving GPRS support node, data structures in the serving GPRS support node are updated (402) to reflect that the at least one BSSGP virtual connection has been cancelled.

9 Claims, 6 Drawing Sheets

---

TRANSMITTING A SIGNAL INDICATING CANCELLATION OF AT LEAST ONE BVC — 401

↓

UPDATING DATA STRUCTURES IN THE SGSN TO REFLECT THAT THE AT LEAST ONE BVC HAS BEEN CANCELLED — 402

US 6,898,425 B1

METHOD IN A COMMUNICATION NETWORK

RELATED APPLICATIONS

This Application claims priority from and incorporates herein by reference the entire disclosures of U.S. Patent Application No. 60/172,295 filed Dec. 16, 1999 and Swedish Patent Application SE0000960-5 filed on Mar. 21, 2000.

TECHNICAL FIELD OF THE INVENTION

The invention relates to a communication network supporting a general packet radio communication service (GPRS). More in particular, the invention relates to a method of configuring an interface between a Serving GPRS Support Node (SGSN) and a Base Station System (BSS).

DESCRIPTION OF RELATED ART

General packet radio service (GPRS) is a standard from the European Telecommunications Standards Institute (ETSI) on packet data in GSM systems. GPRS has also been accepted by the Telecommunications Industry Association (TIA) as the packet-data standard for TDMA/136 systems. By adding GPRS functionality to the public land mobile network (PLMN), operators can give their subscribers resource-efficient access to external Internet protocol-based (IP) networks.

A communication network supporting GPRS includes a base station system (BSS) connected via a $G_b$ interface to a serving GPRS support node (SGSN). The $G_b$ interface is currently based on frame relay. The $G_b$ interface includes a BSS GPRS Protocol (BSSGP) layer in which peer functional entities in the base station system and the serving GPRS support node communicate via so called BSSGP Virtual Connections (BVCs). Each BSSGP Virtual Connection is identified by a combination of a BSSGP Virtual Connection Identifier (BVCI) and a Network Service Entity Identifier (NSEI). Configuring the Gb interface is to a large extent performed using manual procedures at both ends of the interface.

SUMMARY OF THE INVENTION

The present invention addresses the problem of providing a more efficient way of configuring an interface between a serving GPRS support node and a base station system, and in particular such an interface utilizing IP based communication.

The problem is solved by a method in which a signal is transmitted from the base station system to the serving GPRS support node indicating cancellation of at least one BSSGP virtual connection associated with a first network service entity identifier. Upon receiving the cancellation signal at the serving GPRS support node, data structures in the serving GPRS support node are updated to reflect that the at least one BSSGP virtual connection has been cancelled.

In preferred embodiments of the invention, transmission of the cancellation signal is automatically initiated when performing a reconfiguration of the base station system causing cancellation of said at least one BSSGP virual connection at the base station system.

An object of the invention is to provide a more efficient way of configuring an interface between a serving GPRS support node and a base station system, and in particular such an interface utilizing IP based communication.

An advantage afforded by the invention is that it provides a more efficient way of configuring an interface between a serving GPRS support node and a base station system, and in particular such an interface utilizing IP based communication.

The invention will now be described in more detail with reference to exemplary embodiments thereof and also with reference to the accompanying drawings.

DETAILED DESCRIPTION OF THE EMBODIMENTS

General packet radio service (GPRS) is a standard from the European Telecommunications Standards Institute (ETSI) on packet data in GSM systems. GPRS has also been accepted by the Telecommunications Industry Association (TIA) as the packet-data standard for TDMA/136 systems. By adding GPRS functionality to the public land mobile network (PLMN), operators can give their subscribers resource-efficient access to external Internet protocol-based (IP) networks.

GPRS offers air-interface transfer rates up to 115 kbit/s subject to mobile terminal capabilities and carrier interference. Even higher transfer rates will be available when so called EDGE technology, i.e. enhanced data rates for GSM and TDMA/136 evolution, is introduced. Moreover, GPRS allows several users to share the same air-interface resources and enables operators to charge customers for wireless services based on the amount of transferred data instead of connection time.

Figure 1:
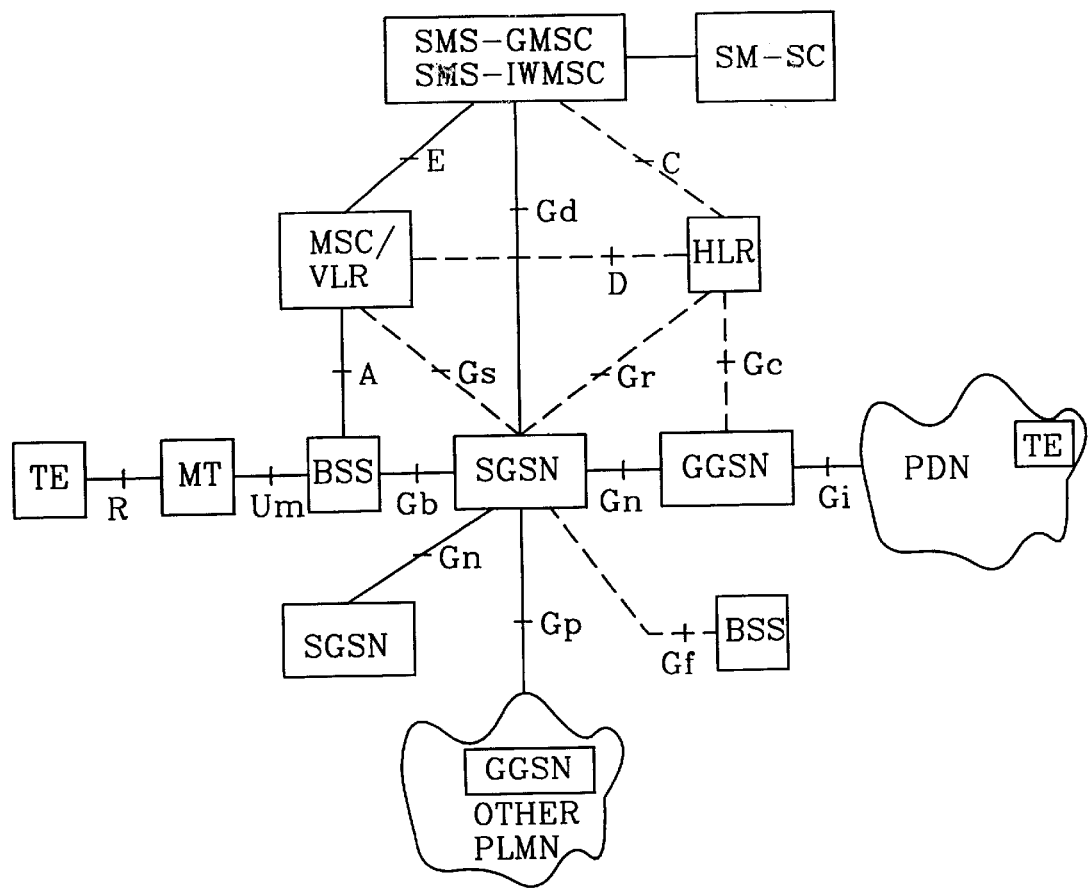
FIG. 1 is a view illustrating configuration of a PLMN supporting GPRS

FIG. 1 illustrates configuration of a Public Land Mobile Network (PLMN), i.e. a cellular network, supporting GPRS. As compared to a traditional GSM network, GPRS introduces two new nodes for handling packet traffic, the serving GPRS support node (SGSN) and the gateway GPRS support node (GGSN). These nodes interwork with the home location register (HLR), the mobile switching center/visitor location register (MSC/VLR) and base station system (BSS).

The GGSN, which is the interconnection point for packet data networks, is connected to the SGSN via an IP backbone. User data, for example from a GPRS terminal to the Internet, is sent encapsulated over the IP backbone.

The SGSN, in turn, is connected to the BSS and resides at the same hierarchical level in the network as the MSC/

VLR. It keeps track of the location of the GPRS user, performs security functions and handles access control, i.e. to a large extent, it does for the packet data service what the MSC/VLR does for circuit-switched service.

Figure 2:
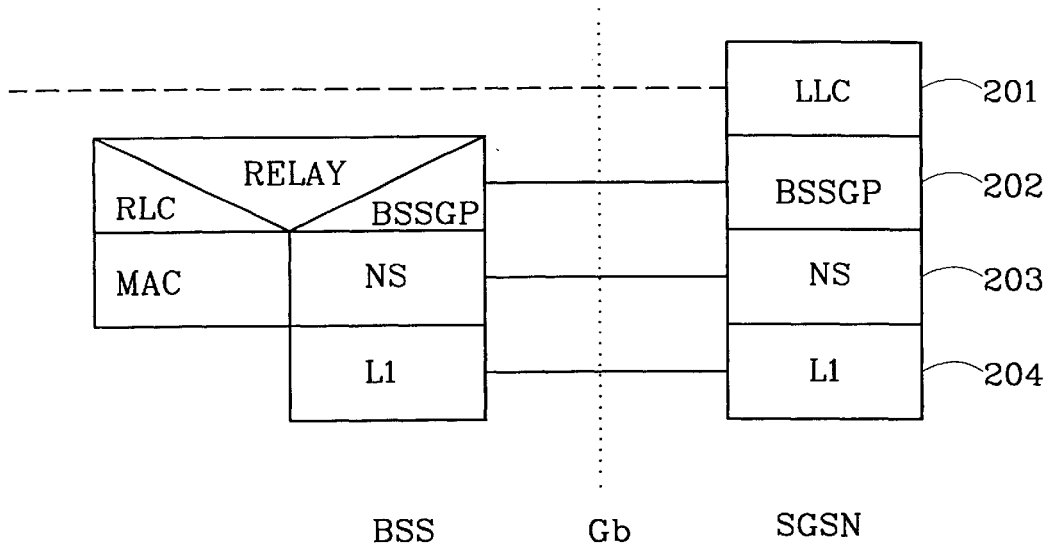
FIG. 2 is a block diagram illustrating the current Gb interface between SGSN and BSS.

FIG. 2 illustrates the so called Gb interface which interconnects the BSS and the SGSN, allowing the exchange of signalling information and user data.

Starting at the top in FIG. 2, the Logical Link Control (LLC) protocol layer 201 provides a reliable logical link between the SGSN and mobile stations operating in the area served by the SGSN, i.e. the SGSN area. The LLC protocol 201 is terminated in the mobile stations and the SGSN and is thus transparent to the BSS.

The primary function of the BSS GPRS Protocol (BSSGP) layer 202 is to provide the radio-related, Quality of Service and routing information that is required to transmit user data between the BSS and the SGSN. In the BSS, it acts as an interface between Logical Link Layer Control (LLC) protocol data units, i.e. LLC frames, and Radio Link Control/Medium Access Control (RLC/MAC) blocks. In the SGSN, it forms an interface between RLC/MAC-derived information and LLC frames. Further details of the BSSGP layer 202 can be found in the GSM 08.18 specification.

The Network Service (NS) protocol layer 203 implements the link layer of the OSI model. The NS layer is based on Frame Relay (FR) and provides network service to the BSS GPRS Protocol (BSSGP) layer. It allows ordered transmission of BSSGP Protocol Data Units (PDUs) in a non-reliable fashion, i.e. PDUs may be lost and the correct sequence order of PDUs may not be maintained under exceptional circumstances. Further details of the Network Service layer 203 can be found in the GSM 08.16 specification.

The physical layer 204 may be implemented using e.g. an E1 or T1 transmission line.

In a PLMN supporting GPRS, SGSN and GGSN nodes are interconnected using an IP network, while SGSN and BSS nodes are currently connected using a Frame Relay network. Consequently the network operator needs to build, operate and maintain both an IP network and a Frame Relay network. It would be preferable if the network operator only needed to implement an IP network, and thus it would be advantageous to add IP support to the $G_b$ interface.

In order to minimize the impact on existing functions when adding IP support to the $G_b$ interface and to allow coexistence of IP based and Frame Relay based $G_b$ interfaces, it is desirable to modify the BSSGP protocol layer as little as possible and to maintain a common BSSGP protocol for both IP and Frame Relay based $G_b$ interfaces.

In the BSSGP protocol layer, a key concept is the so called BSSGP Virtual Connections (BVCs) which provide communication paths between BSSGP functional entities. Each BVC is used in the transport of BSSGP PDUs between peer point-to-point (PTP) functional entities, peer point-to-multipoint (PTM) functional entities and peer signalling functional entities.

A PTP functional entity is responsible for PTP user data transmission. There is one PTP functional entity per cell.

A PTM functional entity is responsible for PTM user data transmission. There is only one PTM functional entity per network service entity and there is one or more network service entities per BSS.

A signalling functional entity is responsible for other functions e.g. paging. There is only one signalling entity per network service entity and there is one or more network service entities per BSS.

Each BVC is identified by means of a BSSGP Virtual Connection Identifier (BVCI) which has end-to-end significance across the Gb interface. Each BVCI is further unique within two peer Network Service entities (NSEs) in the Network Service protocol layer. Each network service entity is identified by means of a Network Service Entity Identifier (NSEI). The NSEI together with the BVCI uniquely identifies a BSSGP Virtual connection within an SGSN. BVCI value zero identifies a BSSGP Virtual connection providing communication between peer signalling functional entities, BVCI value one identifies a BSSGP Virtual connection providing communication between peer PTM functional entities, while BVCI values greater than one identifies BSSGP Virtual connections providing communication between peer PTP functional entities.

In order to minimize the impact on the BSSGP protocol layer when adding IP support, it is essential to maintain the BVC concept and since unique identification of a BVC requires a combination of both a BVCI and a NSEI, the Gb interface must continue supporting the use of BVCI and NSEI.

Figure 3:
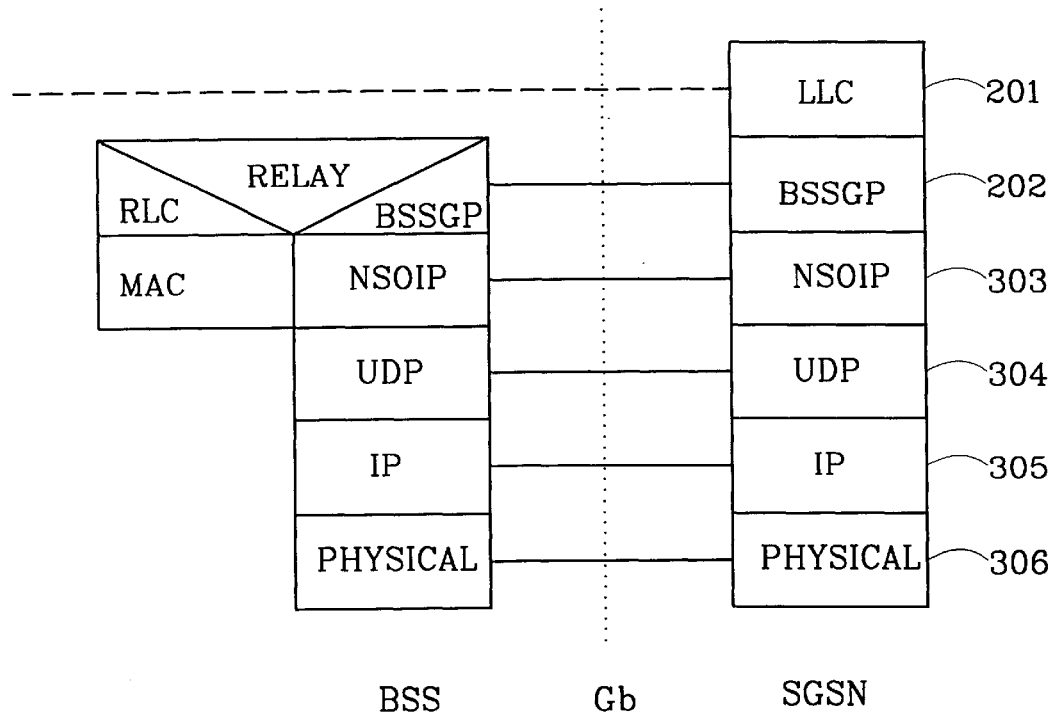
FIG. 3 is a block diagram illustrating a modified Gb interface between SGSN and BSS supporting IP.

FIG. 3 illustrates one exemplary embodiment of a modified Gb interface supporting IP while maintaining the BVC concept.

The LLC protocol layer 201 and BSSGP protocol layer 202 are identical to the corresponding protocol layers in FIG. 2.

A new protocol layer, Network Service over IP (NSOIP) 303, replaces the original NS protocol layer 203. The NSOIP protocol layer 303 is adapted to provide basically the same service to the BSSGP protocol layer 202 as the original NS protocol layer 203 but based on the services offered by the underlying IP based communication services instead of by Frame Relay. Thus, the NSOIP protocol layer 303 can be regarded as an NS protocol layer emulator. The NSOIP protocol layer 303 implements a set of PDUs corresponding to each of the PDUs implemented by the original NS protocol layer 203, but the PDUs implemented by the NSOIP protocol layer 303 all include an additional NSEI information element. Another difference, as compared to the original NS protocol layer 203, is that the NSOIP protocol layer 303 implements an ordering mechanism for ensuring that NSOIP PDUs exchanged between two peer entities are received in the same order as they were sent. Alternatively, the NSOIP protocol could be run on top of the Transmission Control Protocol (TCP) and since TCP ensures that data is received in the same order it is sent, the NSOIP protocol would not need to implement an ordering mechanism.

The protocol layers 304–306 below the NSOIP protocol layer 303, are all in accordance with the well known IETF architecture. The User Datagram Protocol (UDP) is used in the transport protocol layer 304, the Internet Protocol (IP) is used in the Internet layer 305, and the Physical layer 306 may be based e.g. on ATM or SDH/SONET.

A problem with the existing frame relay based Gb interface is that the interface is to a large extent configured by use of manual procedures at both ends of the interface. In particular, when reconfigurations of the base station system causes cancellation of one or more BSSGP virtual connections at the base station system, operation and maintenance personnel responsible for the maintenance of the SGSN node must manually update data structures at the SGSN node to reflect that said BSSGP virtual connections have been cancelled. This is quite a cumbersome procedure, especially if different organizations are responsible for operation and maintenance of the SGSN node and the base station system respectively.

The present invention addresses the problem of providing a more efficient way of configuring a Gb interface between a base station system and a SGSN node, and in particular a Gb interface utilizing IP based communication.

Figure 4:
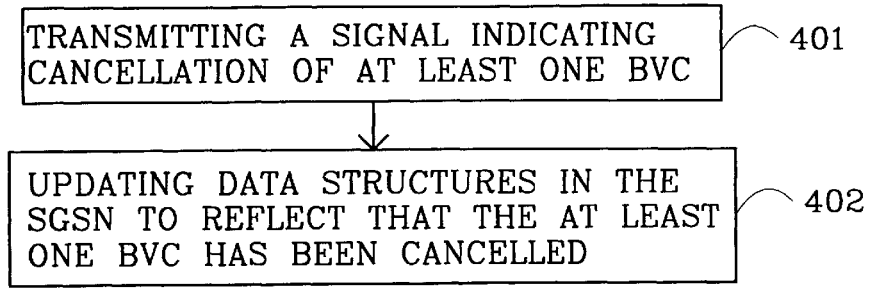
FIG. 4 is a flow diagram illustrating a basic method according to the invention.

FIG. 4 illustrates the basic method according to the invention for configuring an interface between a serving GPRS support node and a base station system in a communication network supporting general packet radio service.

At step 401, a cancellation signal is transmitted, from the base station system to the GPRS support node, indicating cancellation of at least one BSSGP virtual connection associated with a first network service entity identifier.

Upon receipt of the cancellation signal at the serving GPRS support node, data structures in the serving GPRS support node are updated at step 402 to reflect that the at least one BSSGP virtual connection has been cancelled. Updating the data structures to reflect that the at least one BSSGP virtual connection has been cancelled typically involves making the memory locations used for storing data relating to the at least one BSSGP virtual connection available for storing other data.

In preferred embodiments of the invention, transmission of the cancellation signal is automatically initiated when performing a reconfiguration of the base station system causing cancellation of said at least one BSSGP virtual connection at the base station system. Thus, since the serving GPRS support node is automatically informed about the cancellation of said at least one BSSGP virtual connection and automatically updates its data structures accordingly, the interface between the serving GPRS support node and the base station system is automatically configured to match the new configuration of the base station system.

Figure 5:
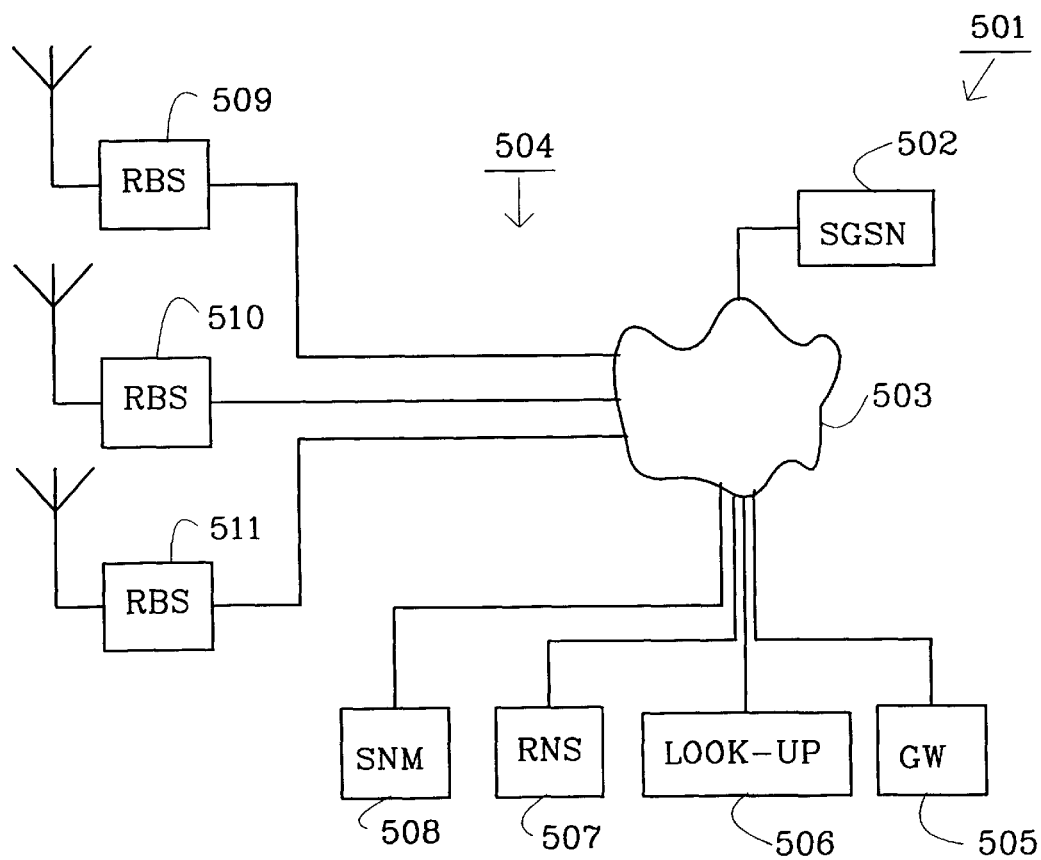
FIG. 5 is a view of an exemplary cellular network in which the present invention is applied.

FIG. 5 illustrates an exemplary embodiment of a cellular network 501 supporting GPRS in which the present invention is applied. The cellular network 501 includes a SGSN node 502, an IP network 503 and a base station system 504.

The base station system 504 includes a gateway (GW) 505, a look-up server 506, a Radio Network Server (RNS) 507, a subnetwork manager (SNM) 508 and three radio base stations (RBSs) 509–511. The SGSN node 502 and all the nodes 505–511 in the base station system 504 are all connected to the IP network 503, i.e. all communication between the different nodes in FIG. 5 is IP based.

The subnetwork manager 508 is an operation and maintenance node enabling the cellular network operator to manage all equipment within the base station system 504.

The radio network server 507 handles traffic control functions, e.g. distribution of paging and allocation of resources for flush, within the base station system 504. Among the data stored in the radio network server 507, there are data structures holding data relating to administrative areas which have been defined in the base station system 504.

An administrative area is a grouping of cells which are all associated with one and the same NSEI, i.e. the BVCs associated with the cells in the administrative area are all identified by the same NSEI value. It is up to the network operator to determine how cells should be grouped into administrative areas. An administrative area may e.g. correspond to one or several location areas or routing areas. If additional radio network servers are added to the base station system 504, each radio network server may be defined to serve one or several administrative areas defined so as to provide a suitable load distribution on the different radio network servers. The network operator may also decide to define the administrative areas according to a scheme which makes each administrative area a suitable area of responsibility for assignment to a certain unit within the network operators operation and maintenance organization.

Figure 7:
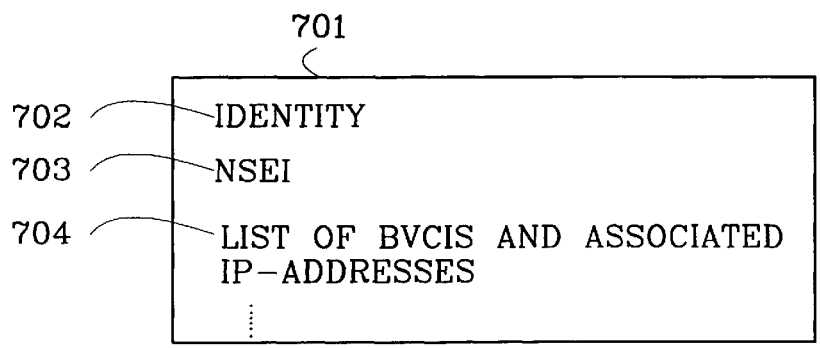
FIG. 7 is a block diagram illustrating an administrative area data record in a radio network server.

FIG. 7 illustrates an exemplary data structure used in the radio network server 507 for holding data relating to an administrative area. The administrative area record 701 includes an identity field 702 for storing the identity of the administrative area, a NSEI field 703 for storing an NSEI value associated with the administrative area and a list 704 of defined BVCI values and associated IP addresses, wherein each defined BVCI value associated with a packet data cell in the adminsitrative area is entered together with the IP address of the radio base station serving said cell.

The radio base stations 509–511 are each capable of serving one or several cells. Each radio base station includes transceivers for transmitting radio signals to and receiving radio signals from mobile stations operating in the cells served by the radio base station. The functions performed by the radio base stations 509–511 include RLC/MAC handling and channel coding.

Figure 8:
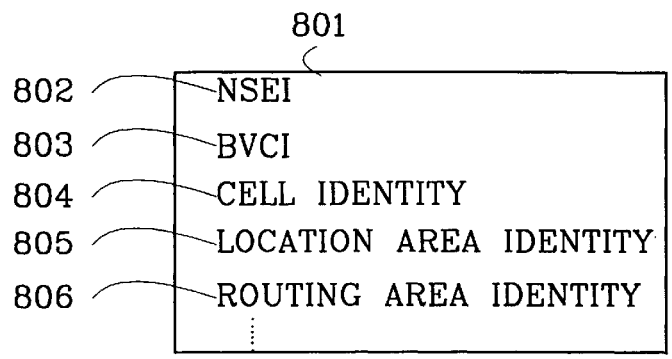
FIG. 8 is a block diagram illustrating a cell configuration data record in a radio baser station.

Among the data stored in each radio base station 509–511, there are data structures including configuration data relating to each cell served by the radio base station. FIG. 8 illustrates an exemplary data structure used in the radio base stations 509–511 for storing cell configuring data. The cell configuring data record 801 includes a NSEI field 802, a BVCI field 803, a cell identity field 804, a location area identity field 805, a routing area identity field 806. The NSEI field 802 together with the BVCI field 803 identifies the BVC associated with the cell.

Figure 9:
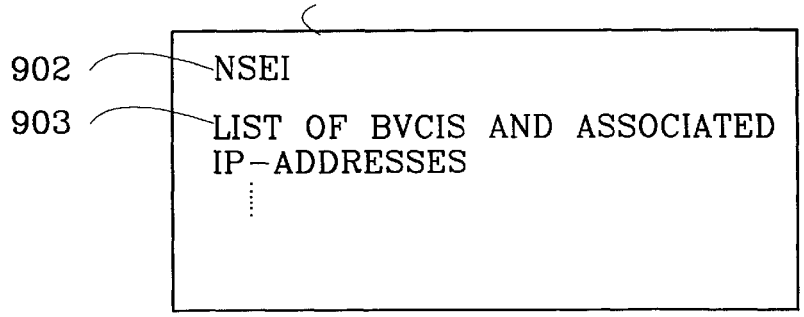
FIG. 9 is a block diagram illustrating a NSEI data record in a gateway.

All communication between the base station system 504 and the SGSN node 502 passes through the gateway 505. The gateway 505 is responsible for performing signal format conversion between a signal format used for signalling internally in the base station system 504 and the signal format used for signalling in the Gb interface between the base station system 504 and the SGSN node 502. For signals, i.e. messages, transmitted from the SGSN node 502 to the base station system 504, the gateway 505 implements a signal distributing function which, based on the BVCI and NSEI values embedded in signals from the SGSN node 502, distributes the information in the signals to the radio network server 507 or one of the radio base stations 509–511. Among the data stored at the gateway 505, there are data structures holding data relating to how signals received from the SGSN node 502 shall be distributed. FIG. 9 illustrates an example of a possible signal distribution data structure. The NSEI record 901 includes a NSEI field 902 and a list 903 of defined BVCI values and associated IP addresses, wherein each defined BVCI value is associated with an IP address of either the radio network server 507 or one of the radio base stations 509–511. Thus the NSEI record 901 controls to which node the gateway 505 distributes information received from the SGSN node 502.

The look-up server 506 implements miscellaneous look up functions similar to the IETF Domain Name System (DNS). It provides e.g. for translation between host names of the different nodes in the base station system 504 and IP addresses assigned to the nodes.

Note that only elements deemed necessary for illustrating the present invention are illustrated in FIG. 5 and thus a cellular radio communication network in which the invention is applied may comprise a greater number of the node types illustrated in FIG. 5 as well as other types of nodes such as gateway GPRS support nodes, home location registers etc.

Figure 6A:
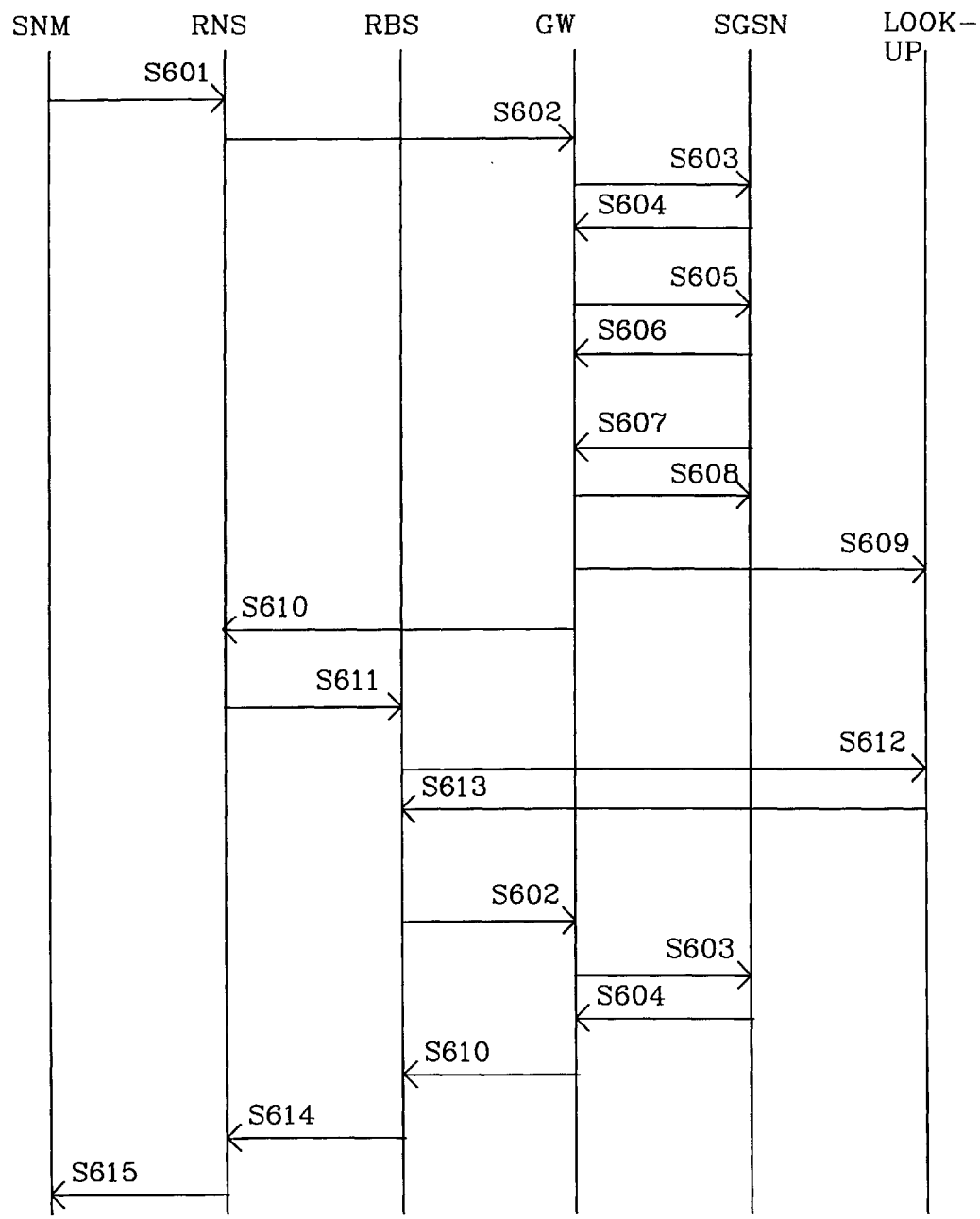
FIGS. 6A–6B are signalling diagrams illustrating a first exemplary embodiment of a method according to the invention.
Figure 6B:
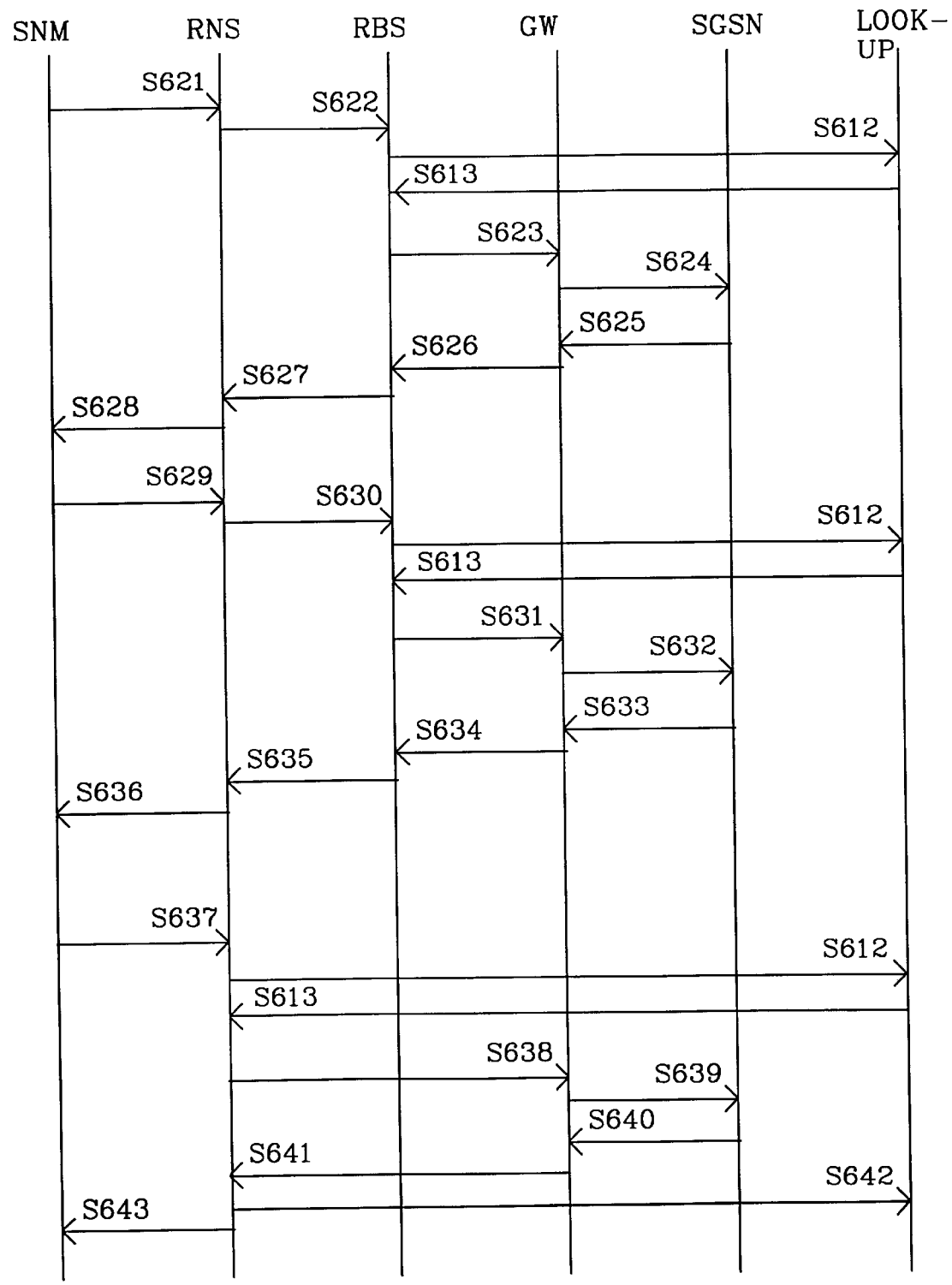

FIG. 6A and FIG. 6B illustrates signalling sequences in a scenario illustrating a first exemplary embodiment of a method according to the invention for configuring the interface between the SGSN node 502 and the base station system 504 in the cellular network 501 illustrated in FIG. 5. In this exemplary first embodiment of a method according to the invention, the interface between the SGSN node 502 and the base station system 504 is automatically configured to match the configuration of the base station system 604.

The scenario begins when a first packet data cell in a new administrative area within the area served by the SGSN node 502 shall be configured. Note that prior to when the scenario begins, the different nodes have been configured to handle basic IP communication according to standard procedures for configuring IP network hosts.

Operation and maintenance personnel initiates configuration of the packet data cell by supplying required configuration parameters to the subnetwork manager 508 and ordering the subnetwork manager 508 to effect configuration. FIG. 6A illustrates how the subnetwork manager 508 transmits a configure packet data cell signal S601 to the radio network server 507. The signal includes an identification of the new administrative area, e.g. as a text string such as "Sweden-West", cell identity, location area identity, routing area identity, the BVCI value which is to be associated with the first packet data cell in the new administrative area and the identities of the radio base station, e.g. the first radio base station 509, and radio base station antenna sector which shall serve the cell.

The radio network server 507 receives the configure packet data cell signal S601 and checks whether the administrative area has been defined previously. The radio network server 507 recognizes that the administrative area is a new area, and initiates an administrative area record (see FIG. 7) for holding data relating to the administrative area. The radio network server 507 also automatically recognizes that a new NSEI value needs to be allocated for the new administrative area and transmits a Reset BVC signal S602 to the gateway 505. The Reset BVC signal S602 includes a BVCI field set to zero and a NSEI field set to a null value. The NSEI null value is a reserved value which is never assigned as a NSEI value. It may e.g. be set to the numerical value 65535. The NSEI null value is an indication that allocation of a new NSEI value is requested.

The gateway 505 receives the Reset BVC signal S602 and recognizes from the NSEI null value of the NSEI field that allocation of a new NSEI value is requested. The gateway 505 initiates a new NSEI record (see FIG. 9) for the new, so far unknown, NSEI value and enters the BVCI value zero as being associated with the IP address of the radio network server node 507 in the new NSEI record. The gateway 505 transmits a BSSGP BVC-Reset signal S603 to the SGSN node 502. The BSSGP BVC-Reset signal S603 includes a BVC-RESET PDU containing a BVCI information element field set to zero. The BVC-RESET PDU is encapsulated within an NSOIP-UNITDATA PDU in the BSSGP BVC-Reset signal S603. Apart from an additional NSEI information element field, the format of the NSOIP-UNITDATA PDU is essentially similar to a NS-UNITDATA PDU as specified in GSM 08.16. The NSEI information element field is set to the NSEI null value.

The SGSN node 502 receives the BSSGP BVC-Reset signal S603 and recognizes from the NSEI null value of the NSEI information element field in the NSOIP-UNITDATA PDU portion of the signal, that this signal is a request for allocation of a new NSEI value. The SGSN node 502 also recognizes from the BVCI information element field that the signal at the same time also is a request for performing the BVC-RESET procedure for the signalling BVC (i.e. BVCI zero).

The SGSN node 502 thus automatically allocates a new NSEI value according to a predetermined rule which ensures that the new NSEI is unique within the SGSN node 502. The SGSN node 502 may e.g. select the new NSEI value simply by scanning a list of NSEI values currently in use and allocate the first NSEI value which is available. One skilled in the art recognizes that any other rule for allocating a unique NSEI can be used. After allocating the new NSEI value, the SGSN node 502 automatically creates a data structure for holding configuration data associated with the new NSEI value and registers the new NSEI value and the IP address of the gateway 505 in the data structure.

Figure 10:
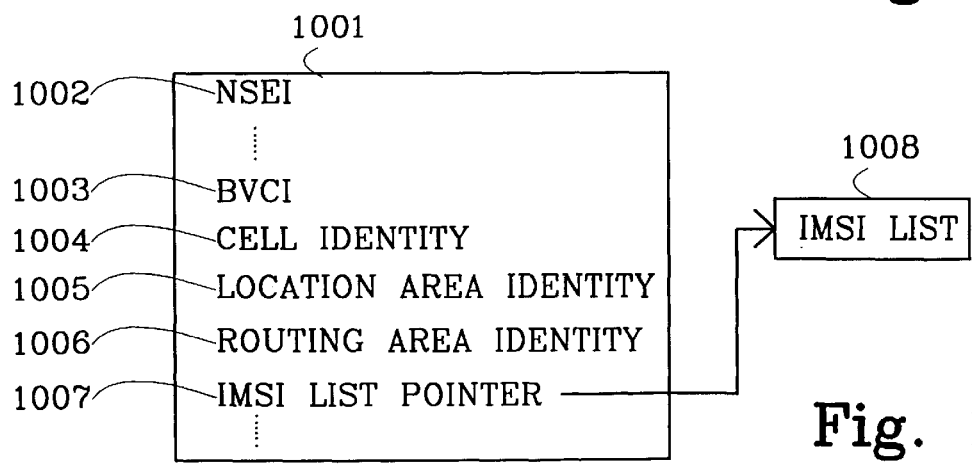
FIG. 10 is a block diagram illustrating a SGSN NSEI data record in a SGSN.

FIG. 10 illustrates an example of a data structure for holding data relating to an NSEI value. The SGSN NSEI data record 1001 includes a NSEI field 1002, and for each defined BVCI having a value of two or greater (i.e. defining a BVC associated with a cell), there is a BVCI field 1003, a cell identity field 1004, a location area field 1005, a routing area field 1006 and an IMSI list pointer field 1007. The IMSI list pointer field 1007 points to a list of IMSI numbers 1008 representing the mobile stations which are currently operating in the cell associated with the BVCI.

After initiating the SGSN NSEI data record 1001 for the new NSEI value, i.e. creating the SGSN NSEI data record 1001 and setting the NSEI field 1002 to the selected new NSEI value, the SGSN node 502 transmits a BSSGP BVC-Reset-Ack signal S604 to the gateway 505. The BSSGP BVC-Reset-Ack signal S604 includes a BVC-RESET-ACK PDU containing a BVCI information element field set to zero. The BVC-RESET-ACK PDU is encapsulated within an NSOIP-UNITDATA PDU in the BSSGP BVC-Reset-Ack signal S604. The NSEI information element field of the NSOIP-UNITDATA PDU is set to the new NSEI value allocated by the SGSN node 502.

The gateway 505 receives the BSSGP BVC-Reset-Ack signal S604 and inserts the new NSEI value in the previously created new NSEI record. The gateway 505, together with the SGSN node 502 then performs NSOIP reset and unblock procedures which are similar to the NS reset and unblock procedures specified in GSM 08.16. During performance of the NSOIP reset procedure, the gateway 505 transmits a NSOIP Reset signal S605 to the SGSN node 502 and receives a NSOIP Reset-Ack signal S606 from the SGSN node 502 while during performance of the NSOIP unblock procedure, the SGSN node 502 transmits a NSOIP Unblock signal S607 to the gateway 505 and receives a NSOIP Unblock-Ack signal S608. The NSOIP PDUs involved in the NSOIP reset and unblock procedures all include an NSEI information element but no Virtual Connection Identifier, since the NSOIP protocol does not distinguish between different Virtual Connections. After performing the NSOIP reset and unblock procedures, the new NSEI value is known and also registered as unblocked in both the base station system 504 and the SGSN node 502.

The gateway 505 then sends a register signal S609 to the look-up server 506 requesting the look up server 506 to register the new NSEI value as being associated with the IP address of the gateway 505. The register signal S609 includes the new NSEI value and the IP address of the gateway 505. The look-up server 506 then performs registration accordingly.

The gateway 505 also sends a Reset BVC-Ack signal S610 to the radio network server 507. The signal includes a BVCI field set to zero and a NSEI field set to the new NSEI value. The radio network server 507 registers the new NSEI value in the administrative area record (see FIG. 7) previously prepared for holding data relating to the new administrative area.

The radio network server 507 then transmits a configure cell signal S611 to the first radio base station 509. The configure cell signal S611 includes the radio base station antenna sector identity, the cell identity, location area, routing area identity and the BVCI value previously received by the radio network server 507 from the subnetwork manager 508 in the configure packet data cell signal S601. The configure cell signal S611 also includes the new NSEI value associated with the new administrative area to which the cell belongs.

The first radio base station 509 receives the configure cell signal 611 and initiates a new cell configuration data record (see FIG. 8) with the configuring data defining the new packet data cell, i.e. the cell identity, location area identity, routing area identity, BVCI value and NSEI value. The first base station 509 then transmits a look-up request signal S612 to the look-up server 506, requesting the IP address associated with the new NSEI value. The look up-server 506 returns a look-up response signal S613 to the first radio base station 509 including the IP address of the gateway 505. The first base station 509 proceeds to initiate a BVC reset procedure 509 by transmitting a Reset BVC signal S602 to the gateway 505. The Reset BVC signal S602 includes cell configuration data for the new cell, i.e. the NSEI value, BVCI value, cell identity, location area identity and routing area identity stored in the new cell configuration data record.

The gateway 505 receives the Reset BVC signal S602 and updates the NSEI record identified by the NSEI value in the signal with the included BVCI value and the associated IP address of the first base station 509. The gateway 505 transmits a BSSGP BVC-Reset signal S603 to the SGSN node 502. The BSSGP BVC-Reset signal S603 includes a BVC-RESET PDU including the cell configuration data for the new cell. The BVC-RESET PDU is encapsulated within an NSOIP-UNITDATA PDU including a NSEI information element field set according to the NSEI value for the new cell.

The SGSN node 502 receives the BSSGP BVC-Reset signal S603 and identifies from the received NSEI value, the SGSN NSEI data record (see FIG. 10) associated with the NSEI value. The SGSN node 502 updates the SGSN NSEI data record with the cell configuration data for the new cell received in the BSSGP BVC-Reset signal and returns a BSSGP BVC-Reset-Ack signal S604 to the gateway 505.

The gateway 505 receives the BSSGP BVC-Reset-Ack signal S604. The gateway identifies the IP address of the first base station 509 from the NSEI and BVCI information fields of the received signal S604 and the associated NSEI record stored in the gateway 505, and sends a Reset BVC-Ack signal S610 to the first base station 509.

The first base station 509 receives the Reset BVC-Ack signal S610 and informs the radio network server 509 that the new cell has been configured by sending a configure cell response signal S614 including the NSEI and BVCI values associated with the cell.

The radio network server 507 receives the configure cell response signal S614 and recognizes that the new cell has been configured. The radio network server 507 updates the administrative area record holding data relating to the new administrative area by entering the BVCI value associated with the new cell and the IP address of the first base station 509 in the list 704 of BVCI values and associated radio base station addresses. The radio network server 507 then transmits a configure packet data cell response signal S615 to the subnetwork manager 508. The signal S615 includes the identity of the new administrative area and the BVCI associated with the new cell.

The subnetwork manager 508 receives the configure packet data cell response signal S615 and recognizes that the new cell in the new administrative area has been correctly configured. The subnetwork manager 508 may provide an indication to operation and maintenance personnel that the new cell has been correctly configured.

Thus, after performing the actions illustrated in FIG. 6A and described above, the new administrative area and the first packet data cell in this administrative area are defined in the base station system 504 and the interface between the SGSN node 502 and the base station system 504 has been configured so that the new NSEI value, the signalling BVC associated with the new NSEI value and the BVC associated with the first packet data cell are known and operational at both sides of said interface.

Additional packet data cells may be added to the new administrative area by initiating transmission of additional configure packet data cell signals S601 from the subnetwork manager 508 to the radio network server 507, wherein said configure packet data cell signals S601 include the identity of the new administrative area and additional configuration data defining the respective packet data cell. When the radio network server 507 receives these configure packet data cell signals S601 including the identity of the new administrative area, it recognizes that these signals relate to the addition of packet data cells to an already existing administrative area. Thus, the radio network server S601 proceeds by sending corresponding configure cell signals S611 to the concerned radio base stations 509–511 and similar actions and interactions, as already described for the configure cell signal S611 illustrated in FIG. 6A, occur. Thus, for each additional packet added to the new administrative area, an additional BVC is added to the interface between the SGSN node 502 and the base station system 504.

In similar ways, additional administrative areas may be defined and packet data cells may be added to these additional administrative areas while the interface between the SGSN node and the base station system 504 is automatically updated to include the corresponding NSEIs and BVCs.

Configuring of the base station system 504 and the Gb interface involves not only the adding of administrative areas and packet data cells, represented in the Gb interface by the corresponding NSEIs and BVCs, but also the removing of packet data cells and administrative areas and the corresponding NSEIs and BVCs.

FIG. 6B illustrates signal interactions when reconfiguring the base station system 504 by deleting a packet data cell and an administrative area, e.g. the first packet data cell and the new administrative area configured in FIG. 6A.

Before initiating deletion of the first packet data cell, operation and maintenance personnel orders via the subnetwork manager 508 blocking of the packet data cell. The subnetwork manager 508 transmits a block packet data cell signal S621 to the radio network server 507. The block packet data cell signal S621 includes an administrative area identity field set to the identity of the new administrative area and a BVCI field set to the BVCI value associated with the first packet data cell.

Upon receiving the block packet data cell signal S621, the radio network server 507 examines the administrative area record associated with the received administrative area identity and retrieves both the NSEI value and the IP address associated with the received BVCI value, i.e. the IP address of the first radio base station 509, stored in said record. The radio network server 507 then transmits a block cell signal S622 to the first radio base station 509. The block cell signal S622 includes a NSEI field set to the retrieved NSEI value and a BVCI field set to the BVCI value received in the block packet data cell signal S621.

Upon receiving the block cell signal S622, the first radio base station 509 treats the BVC corresponding to the received NSEI and BVCI values, i.e. the BVC associated with the first packet data cell, as blocked, i.e. discards traffic in the uplink direction/refuses data in the downlink direction (see GSM 08.18). The first radio base station 509 also transmits a look-up request signal S612 to the look-up server 506, requesting the IP address associated with the NSEI value received in the block cell signal S622. The look up-server 506 returns a look-up response signal S613 to the first radio base station 509 including the IP address of the gateway 505. The first base station 509 proceeds by sending a block BVC signal S623 to the gateway 505. The block BVC signal S623 includes a NSEI field and a BVCI field set in accordance with the content of the corresponding fields in the received block cell signal S622.

Upon receiving the block BVC signal S623, the gateway 505 transmits a BSSGP BVC-Block signal S624 to the SGSN node 502. The BSSGP BVC-Block signal S624 includes a BVC-BLOCK PDU encapsulated within a NSOIP-UNITDATA PDU. The BVC-BLOCK PDU includes a BVCI field and the NSOIP-UNITDATA PDU includes a NSEI field set in accordance with the content of the corresponding fields in the received block BVC signal S623.

The SGSN node 502 receives the BSSGP BVC-Block signal S624, marks the BVC identified by the received NSEI and BVCI field values, i.e. the BVC assocaited with the first packet data cell, as blocked and stops transmitting traffic addressed to this BVC (see GSM 08.18). The SGSN node 502 acknowledges the blocking of the BVC by returning a BSSGP BVC-Block-Ack signal S625 including a BSSGP BLOCK-ACK PDU encapsulated within a NSOIP-UNITDATA PDU. The BVC-BLOCK-ACK PDU includes a BVCI field and the NSOIP-UNITDATA PDU includes a NSEI field set in accordance with the content of the corresponding fields in the received BSSGP BVC-Block signal S624.

Upon receiving the BSSGP BVC-Block-Ack signal S625, the gateway transmits a block BVC response signal S626 to the first radio base station 509. The Block BVC response signal S626 includes a BVCI field and a NSEI field set in accordance with the content of the corresponding fields in the received BSSGP BVC-Block-Ack signal S625.

The first radio base station 509 proceeds, upon receipt of the block BVC response signal S626, by transmitting a block cell response signal S627 to the radio network server 507. The block cell response signal S627 includes a BVCI field and a NSEI field set in accordance with the content of the corresponding fields in the received block BVC response signal S626.

The radio network server 507 receives the block cell response signal S627 and transmits a block packet data cell response signal S628 to the subnetwork manager 508. The block packet data cell response signal S628 includes an administrative area identity field set to the administrative area identity associated with the NSEI value received in the block cell response signal S627 and a BVCI field set to the BVCI value received in the block cell response signal S627.

Operation and maintenance personnel then initiates deletion of the first packet data cell via the subnetwork manager 508. The subnetwork manager 508 transmits a delete packet data cell signal S629 to the radio network server 507. The delete packet data cell signal S629 includes an administrative area identity field set to the identity of the new administrative area and a BVCI field set to the BVCI value associated with the first packet data cell.

Upon receiving the delete packet data cell signal S629, the radio network server 507 examines the administrative area record (see FIG. 7) associated with the received administrative area identity. The radio network server 507 retrieves both the NSEI value and the IP address associated with the received BVCI value, i.e. the IP address of the first radio base station 509, stored in said record. The radio network server 507 then transmits a delete cell signal S630 to the first radio base station 509. The delete cell signal S630 includes a NSEI field set to the retrieved NSEI value and a BVCI field set to the BVCI value received in the delete packet data cell signal S629.

Upon receiving the delete cell signal S630, the first radio base station 509 transmits a look-up request signal S612 to the look-up server 506, requesting the IP address associated with the NSEI value received in the delete cell signal S630. The look up-server 506 returns a look-up response signal S613 to the first radio base station 509 including the IP address of the gateway 505. The first base station 509 proceeds by sending a delete BVC signal S631 to the gateway 505. The delete BVC signal S631 includes a NSEI field and a BVCI field set in accordance with the content of the corresponding fields in the received delete cell signal S630.

Upon receiving the delete BVC signal S631, the gateway 505 transmits a BSSGP BVC-Delete signal S632 to the SGSN node 502. The BSSGP BVC-Delete signal S632 includes a new BSSGP PDU, BVC-DELETE PDU, encapsulated within a NSOIP-UNITDATA PDU. The BVC-DELETE PDU includes a BVCI field and the NSOIP-UNITDATA PDU includes a NSEI field set in accordance with the content of the corresponding fields in the received delete BVC signal S631.

Upon receiving the BSSGP BVC-Delete signal S632, the SGSN node 502 updates its data structures to reflect that the BVC identified by the NSEI and BVCI values received in the BSSGP BVC-Delete signal, i.e. the BVC associated with the first packet data cell, has been cancelled. Thus, the SGSN node 502 removes from the relevant SGSN NSEI data record 1001 (see FIG. 10) all data associated with the received BVCI value, i.e. the BVCI field 1003, the cell identity field 1004, the location area field 1005, the routing area field and the IMSI list pointer field 1007, and makes the memory locations associated with said fields available for storing other data.

The SGSN node 502 acknowledges that data relating to the BVC previously associated with the first packet data cell has been removed from its data structures by returning a BSSGP BVC-Delete-Ack signal S633 including a new BSSGP PDU, BSSGP DELETE-ACK PDU, encapsulated within a NSOIP-UNITDATA PDU. The BVC-DELETE-ACK PDU includes a BVCI field and the NSOIP-UNITDATA PDU includes a NSEI field set in accordance with the content of the corresponding fields in the received BSSGP BVC-Delete signal S632.

Upon receiving the BSSGP BVC-Delete-Ack signal S633, the gateway 505 updates the relevant NSEI data record 901 (see FIG. 9) by removing the entry in the list 903 of BVCI values and associated IP addresses relating to the received BVCI value. The gateway 505 also transmits a delete BVC response signal S634 to the first radio base station 509. The delete BVC response signal S634 includes a BVCI field and a NSEI field set in accordance with the content of the corresponding fields in the received BSSGP BVC-Delete-Ack signal S633.

Upon receiving the delete BVC response signal S634, the first radio base station 509 removes all data relating to the first packet data cell, including the cell configuration data record (see FIG. 8), and transmits a delete cell response signal S635 to the radio network server 507. The delete cell response signal S635 includes a BVCI field and a NSEI field set in accordance with the content of the corresponding fields in the received delete BVC response signal S634.

Upon receiving the delete cell response signal S635, the radio network server 507 updates the relevant administrative area record by removing the entry relating to the received BVCI value and transmits a delete packet data cell response signal S636 to the subnetwork manager 508. The delete packet data cell response signal S636 includes an administrative area identity field set to the administrative area identity associated with the NSEI value received in the delete cell response signal S635 and a BVCI field set to the BVCI value received in the delete cell response signal S635. The subnetwork manager 508 may provide an indication to operation and maintenance personnel that the first packet data cell has been deleted from the base station system 504.

At this point, the first packet data cell has been deleted from the base station system 504 and the corresponding BVC has been cancelled from the interface between the base station system 504 and the SGSN node 502.

In this example scenario, operation and maintenance personnel then initiates deletion of the new administrative area via the subnetwork manager 508. The subnetwork manager transmits a delete administrative area signal S637 to the radio network server 507. The delete administrative area signal S637 includes an administrative area identity field set to the identity of the new administrative area.

Upon receiving the delete administrative area signal S637, the radio network server 507 examines the administrative area record associated with the received administrative area identity and checks the list 704 of BVCI values and associated IP addresses to determine whether there are any packet data cells associated with the administrative area being deleted. If the radio network server 507 would determine that there are packet data cells associated with the administrative area being deleted, the radio network server 507 would order the radio base stations serving said cells to delete all data relating to these cells. However, in this particular example scenario, it is assumed that there is no packet data cell associated with the administrative area being deleted, and the radio network server 507 proceeds by retrieving the NSEI value stored in said administrative area record. The radio network server 507 then transmits a look-up request signal S612 to the look-up server 506, requesting the IP address associated with the retrieved NSEI value. The look up-server 506 returns a look-up response signal S613 to the radio network server 509 including the IP address of the gateway 505. The radio network server 507 proceeds by transmitting a delete NSEI signal S638 to the gateway 505. The delete NSEI signal S638 includes a NSEI field set to the retrieved NSEI value.

Upon receiving the delete NSEI signal S638, the gateway 505 transmits a NSOIP NSEI-Delete signal S639 to the SGSN node 502. The NSOIP NSEI-Delete signal S639 includes a NSOIP-NSEI-DELETE PDU. The NSOIP-NSEI-DELETE PDU includes a NSEI field set to the NSEI value received in the delete NSEI signal S638.

Upon receiving the NSOIP NSEI-Delete signal S639, the SGSN node 502 updates its data structures to reflect that the NSEI value and all BVCs associated with the NSEI value have been cancelled. In this particular example scenario exemplary, said BVCs only includes the signalling BVC. Thus, the SGSN node 502 deletes the relevant SGSN NSEI data record 1001 (see FIG. 10) and makes the corresponding memory locations available for storing other data. The SGSN node 502 also marks the NSEI value as available.

The SGSN node 502 acknowledges that its data structures has been updated by returning a NSOIP NSEI-Delete-Ack signal S640. The NSOIP NSEI-Delete-Ack signal S640 includes a NSOIP-NSEI-DELETE-ACK PDU. The NSOIP-NSEI-DELETE-ACK PDU includes a NSEI field set to the NSEI value received in the delete NSOIP NSEI-Delete signal S639.

Upon receiving the NSOIP NSEI-Delete-Ack signal S640, the gateway 505 deletes the relevant NSEI data record 901 (see FIG. 9). The gateway 505 also transmits a delete NSEI response signal S641 to the radio network server 507. The delete NSEI response signal S641 includes a NSEI field set to the NSEI value received in the NSOIP NSEI-Delete-Ack signal S640.

Upon receiving the delete NSEI response signal S641, the radio network server 507 deletes the administrative area record associated with the NSEI value received in said signal, transmits a delete signal S642 to the look-up server 506 requesting the look-up server to perform deregistration of the entry of the NSEI value, and transmits a delete administrative area response signal S643 to the subnetwork manager 508. The delete administrative area response signal S643 includes the administrative area identity of the deleted administrative area.

The subnetwork manager 508 receives the delete administrative area response signal S643 and recognizes that the administrative area specified in said signal has been deleted. The subnetwork manager 508 may provide an indication to operation and maintenance personnel that the administrative area has been deleted from the base station system 504.

Thus, at this point the new administrative area has been deleted from the base station system 504 and the corresponding signalling BVC and NSEI has been cancelled from the interface between the base station system 504 and the SGSN node 502.

Apart from the exemplary first embodiment of the invention disclosed above, there are several ways of providing rearrangements, modifications and substitutions of the first embodiment resulting in additional embodiments of the invention.

Instead of requesting allocation of a new NSEI value using a BSSGP BVC-Reset signal S603 including both a BVC-RESET PDU and a NSOIP-UNITDATA PDU, i.e. including both a request for allocation of the new NSEI value and performance of a BVC reset procedure, separate signals could be used to request allocation of the new NSEI value and performance of the BVC reset procedure. Thus the NSOIP protocol could include an allocate NSEI PDU and an allocate NSEI-Ack PDU. The gateway 505 would then request allocation of a new NSEI by transmitting a NSOIP allocate NSEI request signal including an NSOIP allocate NSEI PDU and the SGSN node 502 would return the allocated new NSEI value in a NSOIP allocate NSEI-Ack signal including an NSOIP allocate NSEI-Ack PDU conveying the allocated new NSEI value in a NSEI information element. A BSSGP BVC-Reset signal S603 would then be transmitted from the gateway 505 to the SGSN node 502 requesting performance of a BVC reset procedure for the BVC identified by the new NSEI value and BVCI value zero, i.e. the signalling BVC. The signalling internally in the base station system 504 between the radio network server 507 and the radio network server 509, could remain the same as previously described in connection wih FIG. 6A, i.e. the gateway 505 could transmit both the NSOIP allocate NSEI request signal and, after receiving the NSOIP allocate NSEI-Ack signal, the BSSGP BVC-reset signal in response to receiving a Reset BVC signal S602 including a NSEI null value. Alternatively the radio network server 507 could send separate signals to the gateway 505 for requesting transmission of the NSOIP allocate NSEI request signal and the BSSGP BVC-reset signal.

Different schemes can be used to correlate a signal requesting allocation of a new NSEI, e.g. a BSSGP BVC-Reset signal or NSOIP allocate NSEI signal, sent from the base station system 504 to the SGSN node 502 with a response signal conveying an allocated new NSEI value, e.g. a BSSGP BVC-Reset-Ack signal or NSOIP allocate NSEI-Ack signal, from the SGSN node 502 to the base station system 504. One alternative would be to simply restrict the radio network server 507 to not initiate any more requests for allocation of new NSEI values until it have received confirmation that a new NSEI value has been allocated for a previous request, i.e. to ensure that there are no more than one outstanding request for allocation of a new NSEI value at any given moment of time. Another alternative would be to introduce transaction identifiers in signals requesting allocation of a new NSEI and the corresponding response signals. Transaction identifiers are preferably used both in the base station system internal signals and the signals exchanged between the base station system 504 and the serving SGSN node 502. The gateway 505 may perform mapping between base station system 504 internal transaction identifiers and transaction identifiers used in signals exchanged between the base station system 504 and the SGSN node 502.

The invention can of course be applied in cellular networks having other base station system architectures than the exemplary architecture disclosed in FIG. 5. One possible example of an alternative base station system architecture would be a traditional GSM BSS architecture based on a base station controller (BSC) controlling a plurality of radio base stations.

What is claimed is:

1. A method of configuring an interface between a serving GPRS support node and a base station system in a communication network supporting general packet radio service, the method comprising the steps of:
   transmitting a signal from the base station system to the serving GPRS support node requesting allocation of a new network service entity identifier;
   automatically allocating first network service entity identifier according to a predefined rule ensuring that the first network service entity identifier is unique within the serving GPRS support node;
   automatically initiating data structures in the serving GPRS support node and data structures in the base station system by registering the allocated first network service entity identifier in said data structures;
   transmitting a cancellation signal, from the base station system to the serving GPRS support node, indicating cancellation of at least one BSSGP virtual connection associated with the first network service entity identifier;
   updating, upon receiving the cancellation signal at the serving GPRS support node, the data structures in the serving GPRS support node to reflect that the at least one BSSGP virtual connection has been cancelled.

2. A method according to claim 1, wherein transmission of said signal is automatically initiated when performing a reconfiguration of the base station system causing cancellation of said at least one BSSGP virtual connection at the base station system.

3. A method according to claim 1, wherein the at least one BSSGP virtual connection includes at least one point to point BSSGP virtual connection.

4. A method according to claim 3, wherein the method comprises the step of, prior to transmitting said cancellation signal, blocking the at least one point to point BSSGP virtual connection.

5. A method according to claim 1, wherein the at least one BSSGP virtual connection includes a signalling BSSGP virtual connection.

6. A method according to claim 5, wherein the cancellation signal indicates that all BSSGP virtual connections associated with the first network service entity identifier are being cancelled.

7. A method according to claim 6, wherein the step of updating the data structures in the serving GPRS support node includes updating the data structures at the serving GPRS support node to reflect that the first network service entity identifier has been cancelled.

8. A method according to claim 7, wherein the method further comprises the step of transmitting a signal from the serving GPRS support node to the base station system indicating that the data structures at the serving GPRS support node have been updated to reflect that the at least one BSSGP virtual connection has been cancelled.

9. A method according to claim 1, wherein the method comprises the step of automatically detecting a need for allocation of a new network service entity identifier and transmission of the signal requesting allocation of a new network service entity identifier is automatically initiated upon said detecting.

* * * * *